United States Patent [19]
Cloyd et al.

[11] Patent Number: 5,255,505
[45] Date of Patent: Oct. 26, 1993

[54] SYSTEM FOR CAPTURING HEAT TRANSFERRED FROM COMPRESSED COOLING AIR IN A GAS TURBINE

[75] Inventors: Scott T. Cloyd, Lake Mary; Robert A. Hindle, Cocoa Beach; Stephen W. Brown, Oviedo, all of Fla.

[73] Assignee: Westinghouse Electric Corp., Pittsburgh, Pa.

[21] Appl. No.: 838,972

[22] Filed: Feb. 21, 1992

[51] Int. Cl.$^5$ ............................................. F02C 6/18
[52] U.S. Cl. .................................. 60/39.07; 60/39.53; 60/39.55
[58] Field of Search ............... 60/39.07, 39.53, 39.55, 60/39.75, 736

[56] References Cited

U.S. PATENT DOCUMENTS

| | | | |
|---|---|---|---|
| 3,080,716 | 3/1963 | Cummings et al. | 60/736 |
| 3,826,084 | 7/1974 | Branstrom et al. | 60/39.07 |
| 4,020,632 | 5/1977 | Coffinberry et al. | 60/39.03 |
| 4,102,125 | 7/1978 | Schelp | 60/39.53 |
| 4,297,841 | 11/1981 | Cheng | 60/39.53 |
| 4,505,120 | 3/1985 | Mayer | 62/180 |
| 4,932,204 | 6/1990 | Pavel et al. | 60/39.02 |
| 4,977,740 | 12/1990 | Madden et al. | 60/39.55 |
| 4,991,391 | 2/1991 | Kosinski | 60/39.182 |
| 5,054,279 | 10/1991 | Hines | 60/39.53 |
| 5,161,365 | 11/1992 | Wright | 60/736 |
| 5,163,285 | 11/1992 | Mazeaud et al. | 60/39.07 |

FOREIGN PATENT DOCUMENTS

| | | | |
|---|---|---|---|
| 0125325 | 9/1980 | Japan . | |
| 0120826 | 5/1988 | Japan | 60/39.07 |
| 0879745 | 10/1961 | United Kingdom | 60/39.07 |
| 1273766 | 5/1972 | United Kingdom | 60/39.07 |

*Primary Examiner*—Richard A. Bertsch
*Assistant Examiner*—Howard Richman

[57] ABSTRACT

A gas turbine is provided in which heat is removed from compressed air bled from the compressor section, for purposes of cooling in the turbine section, using a first heat exchanger to transfer heat from the cooling air to an intermediate fluid. The heat so removed is then returned to the cycle by transferring it from the intermediate fluid to a fluid to be injected into the combustion section, such as gaseous fuel or water for NOx control, using a second heat exchanger. A third heat exchanger may be used in conjunction with the second heat exchanger to control the temperature of the intermediate fluid and, hence, the temperature of the cooling air.

13 Claims, 3 Drawing Sheets

SYSTEM FOR CAPTURING HEAT TRANSFERRED FROM COMPRESSED COOLING AIR IN A GAS TURBINE

BACKGROUND OF THE INVENTION

The present invention relates to gas turbines. More specifically, the present invention relates to a system and method for capturing heat rejected from the portion of the compressor discharge air that is used to cool the turbine section of the gas turbine by transferring the heat to a fluid to be injected into the combustion section, such as gaseous fuel.

A gas turbine is comprised of three main components: a compressor section in which air is compressed, a combustion section in which the compressed air is heated by burning fuel and a turbine section in which the hot compressed gas from the combustion section is expanded. To achieve maximum power output of the gas turbine, it is desirable to heat the gas flowing through the combustion section to as high a temperature as feasible. Consequently, the components in the turbine section exposed to the hot gas must be adequately cooled so that their temperature is maintained within allowable limits.

Traditionally, this cooling is achieved by flowing relatively cool air over or within the turbine components. Since such cooling air must be pressurized to be effective, it is common practice to bleed a portion of the air discharged from the compressor section and divert it to the turbine components for cooling purposes. Although the cooling air eventually mixes with the hot gas expanding in the turbine, since it bypasses the combustion process much of the work expended in compressing the cooling air is not recovered in the expansion process. Consequently, to maximize the power output and efficiency of the gas turbine, it is desirable to minimize the quantity of cooling air used.

Unfortunately, as a result of the temperature rise which accompanies the rise in pressure in the compressor, the air bled from the compressor is relatively hot—i.e., 315°-425° C. (600°-800° F.) depending on the compression ratio. Consequently, the air bled from the compressor must often be cooled to ensure that its temperature is low enough to adequately cool the turbine components. Moreover, as is well known in the art, the quantity of air bled from the compressor for cooling purposes can be reduced by cooling the air prior to directing it to the turbine components, thereby increasing its capacity to absorb heat.

In the past, an air-to-air cooler was often used to cool the cooling air. In this arrangement, the air bled from the compressor flows through finned tubes over which ambient air is forced by motor driven fans, thereby transferring heat from the compressed air to the atmosphere. Although this method achieves adequate cooling, it detracts from the efficiency of the gas turbine since the heat energy associated with the work expended to compress the cooling air is lost to atmosphere.

It is therefore desirable to provide a system and method for cooling the air bled from the compressor for cooling purposes in which the heat removed from the cooling air is returned to the cycle.

SUMMARY OF THE INVENTION

Accordingly, it is the general object of the present invention to provide a method and system for cooling air bled from the compressor of a gas turbine in which the heat removed from the cooling air is returned to the cycle, specifically, via a fluid, such as gas fuel or water, to be injected into the combustion section of the gas turbine.

Briefly, this object, as well as other objects of the present invention, is accomplished in a gas turbine system having (i) a compressor section for producing compressed air, (ii) a combustion section for producing heated compressed gas by burning fuel in a first portion of the compressed air, (iii) a turbine section for expanding the heated, compressed gas, (iv) a first heat exchanger for cooling a second portion of the compressed air, (v) a second heat exchanger for heating the fuel prior to burning, and (vi) means for circulating a heat transfer fluid through both of the first and second hear exchangers, whereby the fluid absorbs heat from the second portion of the compressed air in the first heat exchanger and rejects heat to the fuel in the second heat exchanger.

DESCRIPTION OF THE PREFERRED EMBODIMENT

Figure 1:
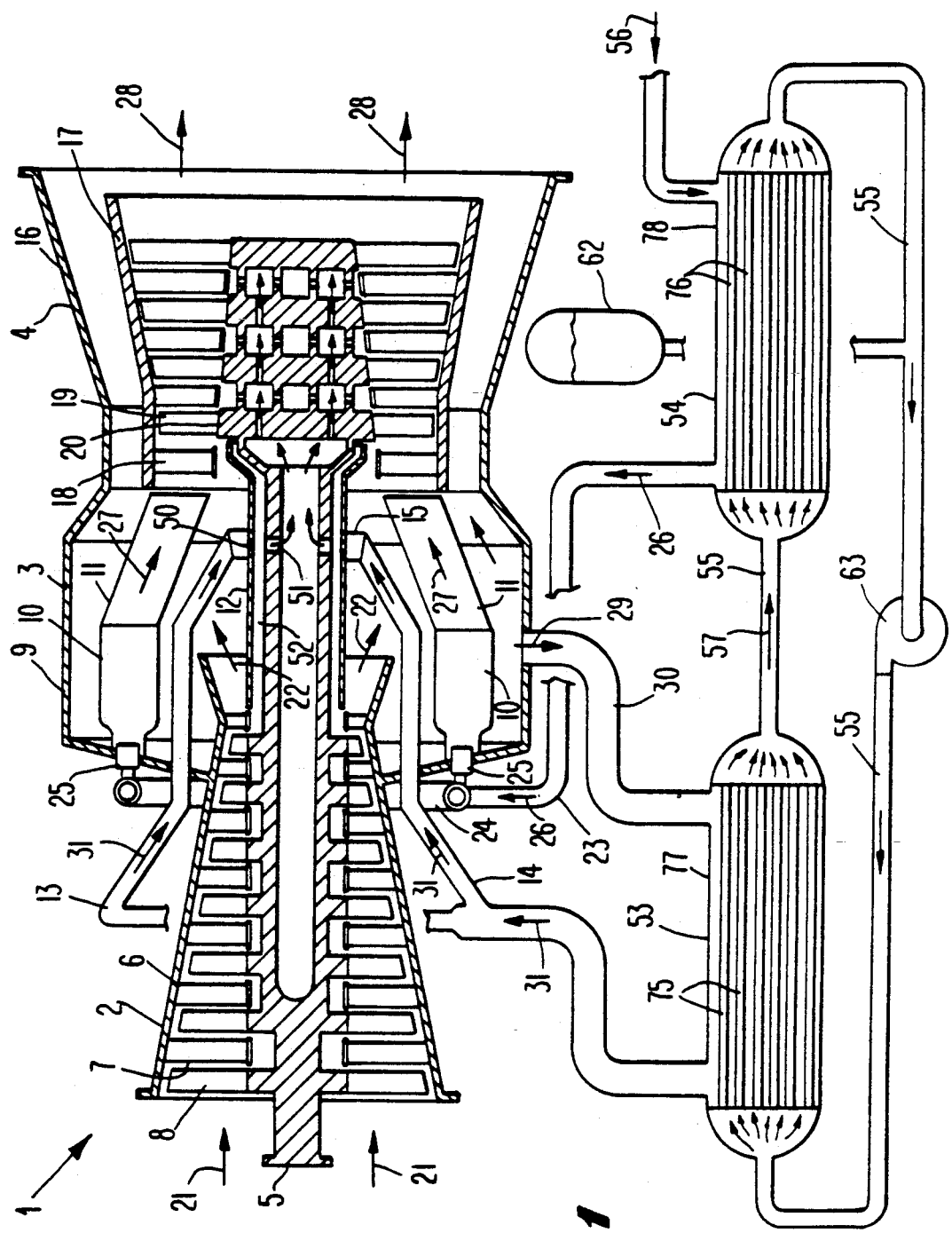
FIG. 1 is a longitudinal cross-section of a gas turbine system incorporating the heat transfer apparatus of the present invention.

Referring to the drawings, there is shown in FIG. 1 a longitudinal cross-section of a gas turbine system 1. The gas turbine is comprised of three main components: a compressor section 2, a combustion section 3, and a turbine section 4. A rotor 5 is centrally disposed in the gas turbine and extends through the three sections. The compressor section 2 is comprised of a cylinder 6 that encloses alternating rows of stationary vanes 7 and rotating blades 8. The stationary vanes 7 are affixed to the cylinder 6 and the rotating blades 8 are affixed to the rotor 5.

The combustion section 3 is comprised of a cylinder 9 which forms a chamber in which are disposed a plurality of combustors 10 and ducts 11 that connect the combustors to the turbine section 4. A fuel supply pipe 23 is connected to a fuel manifold 24 that distributes fuel to a nozzle 25 in each combustor 10. A portion of the rotor 5 extends through the combustion section 3 and is enclosed therein by a housing 12. Cooling air return pipes 13 and 14, discussed further below, penetrate the cylinder 9, extend through the chamber and terminate at a manifold 15 that surrounds a portion of the housing 12.

The turbine section 4 is comprised of an outer cylinder 16 that encloses an inner cylinder 17. The inner cylinder 17 encloses alternating rows of stationary vanes 18 and rotating blades 19. The stationary Vanes 18 are affixed to the inner cylinder 17 and the rotating blades 19 are affixed to a plurality of rotating disks 20 that form the turbine section of the rotor 5.

In operation, the compressor inducts ambient air 21 into its inlet and discharges compressed air 22 into the chamber formed by the cylinder 9. The vast majority of the air 21 in the chamber enters the combustors 10 through holes therein (not shown). In the combustors 10, fuel 26, heated as discussed below, is injected into and mixed with the compressed air 22 and burned, thereby forming a hot, compressed gas 27. The hot, compressed gas 27 flows through the ducts 11 and thence through the alternating rows of stationary vanes 18 and rotating blades 19 in the turbine section 4, wherein the gas expands and generates power that drives a load (not shown) connected to the rotor 5. The expanded gas 28 then exits the turbine, whereupon it may be exhausted to atmosphere or directed to a heat recovery steam generator, discussed below.

The rotating blades 19 and disks 20 in the turbine section are exposed to the hot gas 27 from the combustors 10, which may be in excess of 1090° C. (2000° F.), and are subjected to high stresses as a result of the centrifugal force imposed on them by their rotation. Since the ability of the materials that form the blades and disks to withstand stress decreases with increasing temperature, it is vital to provide adequate cooling to maintain the temperature of these components within allowable levels. In the preferred embodiment, this cooling is accomplished by diverting a portion 29 of the compressed air 22 from the chamber formed by the cylinder 9 to the turbine section of the rotor 5. This diversion is accomplished by bleeding air through an external bleed pipe 30 emanating from the cylinder 9. After being cooled, as explained below, the cooled cooling air 31 re-enters the gas turbine through return pipes 13 and 14. The return pipes direct the air to the manifold 15 after which the cooling air penetrates the housing 12 through holes 50 and enters an annular gap 52 formed between the housing 12 and the rotor 5. The cooling air 31 then enter the rotor 5 through holes 51 whereupon it flows through a plurality of intricate cooling passages (not shown) in the rotating disks and blades to achieve the desired cooling.

It is important to note that the cooling air 29 bypasses the combustors 10. Even though this air eventually mixes with the hot gas expanding in the turbine section 4, the work recovered from the expansion of the compressed cooling air is much less than that recovered from the expansion of the compressed air heated in the combustors. In fact, as a result of losses due to pressure drop and mechanical efficiency, the work recovered from the cooling air is less than that required to compress the air in the compressor. Hence, the greater the quantity of cooling air used the less the net power output of the gas turbine.

In accordance with the present invention, the quantity of cooling air 29 bled from the compressor discharge 22 is reduced by cooling the air, thereby increasing its capacity to absorb heat from and cool the turbine components, without losing the rejected heat from the cycle. This is accomplished by directing the hot cooling air 29 to a cooling air heat exchanger 53, which may be of the shell and tube type, as shown in FIG. 1, in which case the shell 77 forms the flow path for the cooling air 29 and the tubes 75 form the flow path for an intermediate heat transfer fluid 57, discussed further below. The cooling air heat exchanger 53 is connected by a closed loop piping system 55 to a fuel heat exchanger 54 to which unheated gaseous fuel 56 is supplied. As shown in FIG. 1, the fuel heat exchanger 54 may also be of the shell and tube type, in which case the shell 78 forms the flow path for the gaseous fuel 56 and the tubes 76 form the flow path for the intermediate heat transfer fluid 57. It should be noted that both heat exchangers 53 and 54 are of the indirect type in that the tubes 75 and 76 prevent flow communication between the fluids flowing through the heat exchangers.

The intermediate heat transfer fluid 57, which may be essentially water, or at least substantially water—i.e., a glycol/water mixture—is circulated through the heat exchangers 53 and 54 by a pump 63 in the piping system 55. Thus, the cooling air 29 is cooled by rejecting heat to the intermediate fluid 57 that, in turn, is cooled by rejecting heat to the fuel 56, thereby heating the fuel. Since the heated fuel 26 is injected into and burned in the combustors 10, the heat it has absorbed from the cooling air 29, indirectly through the intermediate fluid 57, is returned to the cycle and reduces the quantity of fuel that must be burned to obtain the desired temperature of the gas 27 entering the turbine. Consequently, unlike the traditional approach to cooling the cooling air, discussed above, the current invention does not result in the thermal efficiency of the gas turbine being significantly degraded as a result of the cooling.

It is important to ensure that, in the event of leaks in the heat exchangers 53 and 54, water will not enter the cooling air 31 or fuel 26, since this could result in damage to the turbine components. Thus, in the preferred embodiment, the pressure of the intermediate fluid 57 is maintained below that of the cooling air 29 and fuel 56 so that any leakage paths that form in the heat exchangers will result in air or fuel flowing into the intermediate fluid 57, not vice versa. According to the current invention, pressure maintenance is ensured by incorporating an expansion tank 62 into the piping system 55 so that volume swings due to temperature changes in the intermediate heat transfer fluid 57 will not raise its pressure above that of the cooling air and fuel.

Figure 2:
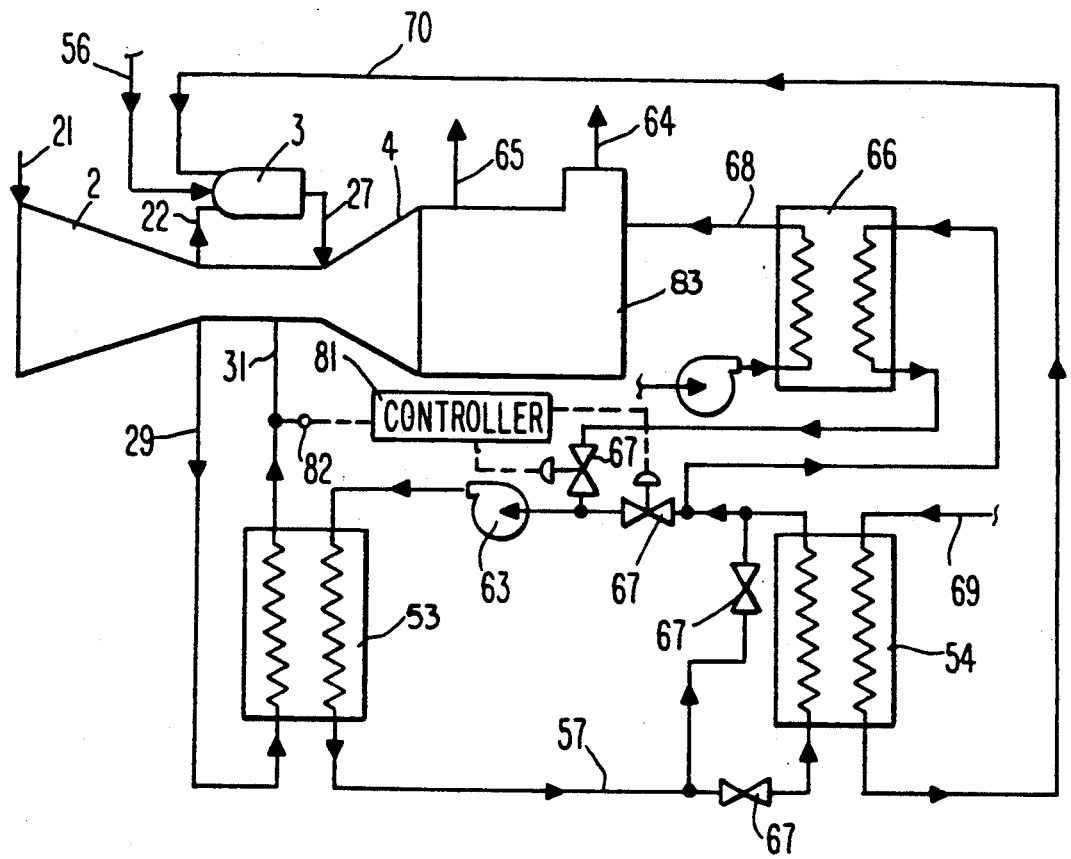
FIG. 2 is a schematic diagram of a second embodiment of the gas turbine system shown in FIG. 1, in which a heat recovery steam generator has been incorporated into the system and water is injected into the combustion system.

In the embodiment shown in FIG. 1 only gaseous fuel 26 is injected into the combustors 10. However, in many applications it is necessary to inject another fluid, such as water or steam, into the combustors 10 to reduce the formation of oxides of nitrogen (NOx), which are considered atmospheric pollutants, in the hot gas 27. Accordingly, as shown in FIG. 2, the current invention may be utilized by directing water 69, rather than gaseous fuel 56, through the heat exchanger 54. When the heated water 70 is injected into the combustion system 3 to reduce NOx, the heat the water absorbed from the intermediate fluid 57 is returned to the cycle.

It may sometimes be undesirable or unnecessary to inject water 70 for NOx control into the gas turbine. In such cases there would be no fluid flowing through heat exchanger 54 to which the heat from the intermediate heat transfer 57 fluid could be rejected. However, since the cooling air 29 must still be cooled nonetheless, an alternate medium must be found to which the heat from the cooling air can be transferred. According to the current invention, this problem is solved by the use of an auxiliary heat exchanger 66, which may be connected so as to be in parallel with the heat exchanger 54, as shown in FIG. 2. By actuating valves 67 in the piping system, the pump 63 will circulate the intermediate fluid 57 through the auxiliary heat exchanger 66, rather than heat exchanger 54. A second pump circulates a secondary heat transfer fluid 68, which may be auxiliary cooling water for the power plant, through the auxiliary heat exchanger 66 so that heat from the intermediate heat transfer fluid 57 is rejected to the secondary heat transfer fluid 68.

Many gas turbines have the capability of switching from operation on gaseous fuel to operation on a liquid fuel, typically no. 2 distillate. Unfortunately, it may be inadvisable to heat such liquid fuels. Moreover, it may be uneconomical to invest in additional heat exchangers suitable for use with liquid fuel since many plants operate on liquid fuel only a few weeks per year. Accordingly, the auxiliary heat exchanger 66 shown in FIG. 2 could be incorporated into the embodiment shown in FIG. 1 so that heat from the intermediate heat transfer fluid 57 could be rejected to the secondary heat transfer fluid 68 when the gas turbine was operating on liquid fuel.

The present invention may be especially advantageously used in a gas turbine operating in a combined cycle gas and steam turbine power plant, a portion of which is shown in FIG. 2. As is typical in such systems, the gas exhausting from the turbine section 4 of the gas turbine flows through a heat recovery steam generator 83, wherein it rejects much of its heat to feed water 68 to produce steam 65 for use in a steam turbine (not shown). According to the current invention, the auxiliary heat exchanger 66 used to cool the intermediate fluid 57 when it is desired not to heat the combustion section injection fluid, which may be gaseous fuel 26 as discussed with respect to the embodiment shown in FIG. 1 or water 70 for NOx control as shown in FIG. 2. In this embodiment, heat exchanger 66 is supplied with feed water 68 for the heat recovery steam generator 83, as shown in FIG. 2. Thus, the heat rejected from the intermediate fluid 57 serves to heat the feed water 68 so that the heat transferred from the cooling air is returned to the cycle as before, albeit on the steam side rather than the gas side.

Although cooling the cooling air 31 has the advantage of reducing the average temperature of the turbine components and, therefore, improves their strength, an excessively low cooling air temperature may cause thermal gradients that result in undesirably high local thermal stresses in the portions of these components directly exposed to the cooling air. Therefore, it is sometimes desirable to control the temperature of the cooling air 31 so that it is maintained within a predetermined range. Accordingly, rather than merely using the auxiliary heat exchanger 66 in place of the heat exchanger 54 when the combustion section injection fluid is not heated, as discussed above, the auxiliary heat exchanger 66 can also be employed in conjunction with heat exchanger 54 to control the temperature of the intermediate fluid 57 and, therefore, the temperature of the cooling air 31 returned to the turbine. This can be accomplished by modulating the valves 67 is the piping system so as to connect the auxiliary heat exchanger 66 at least partially in series with the heat exchanger 54 and to cause a controlled portion of the intermediate fluid 57 to flow through the auxiliary heat exchanger 66, as well as through the heat exchanger 54. As is well know in the fluid flow control art, a sensor 82 could be employed to sense the temperature of the cooled cooling air 31, as shown in FIG. 2. The signal from the sensor 82 is transmitted to a controller 81 that modulates the valves 67 so as to maintain the temperature of the cooling air 31 within the predetermined range.

Figure 3:
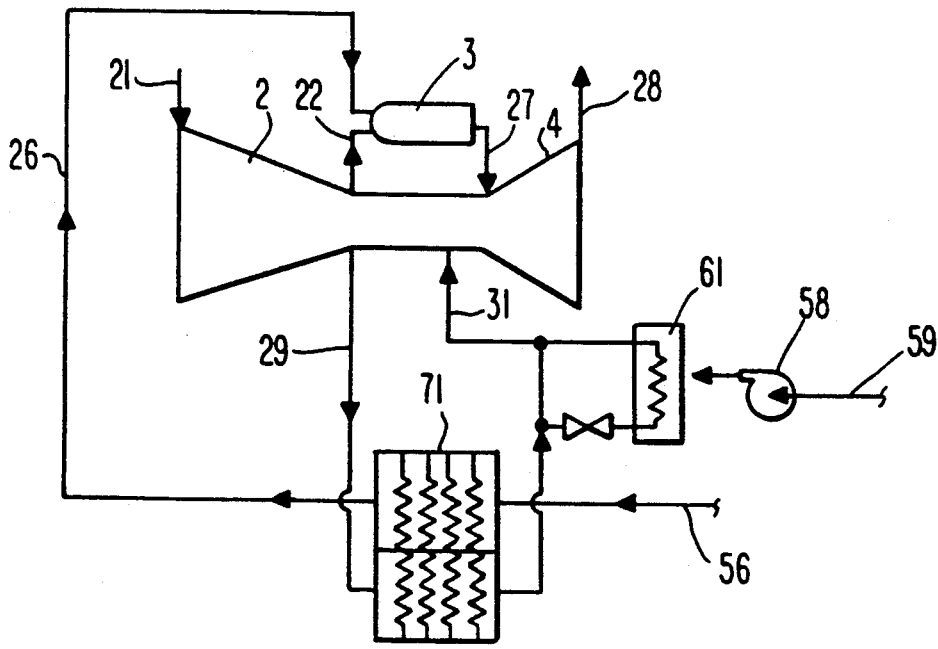
FIG. 3 is a schematic diagram of third embodiment of the gas turbine system shown in FIG. 1 using a heat pipe.
Figure 4:
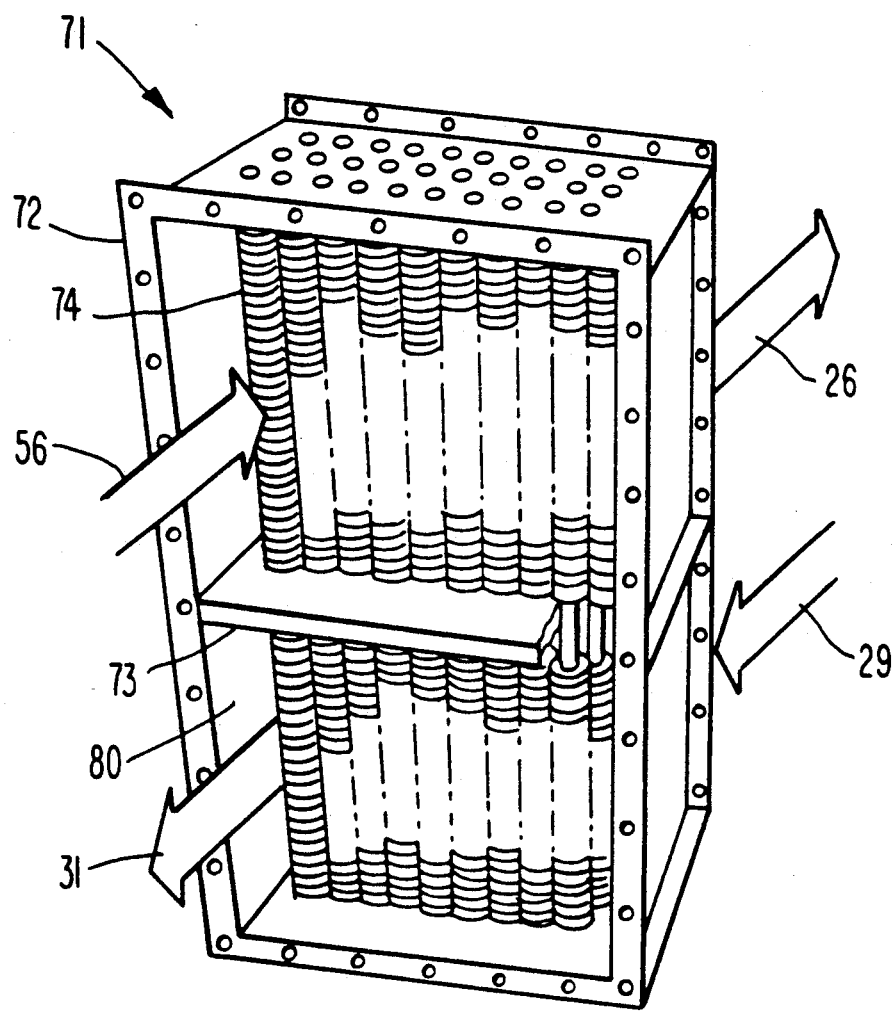
FIG. 4 is an isometric view of the heat pipe shown in FIG. 3.

FIG. 3 shows another embodiment of the invention in which a heat pipe 71 forms the heat exchangers for both the cooling air and fuel. As shown in FIG. 4, the heat pipe 71 is comprised of a duct 72 having a partition 73 that divides its flow area into upper 79 and lower 80 passages. Cooling air 29 flows through the lower passage 80 and gaseous fuel 56 flows through the upper passage 79. A plurality of finned heat transfer tubes 74 are disposed within the duct 72 and extend through both the upper and lower passages. The tubes 74 contain a fluid, such as water, that circulates within each tube by natural circulation. Specifically, the hot cooling air 29 is cooled by rejecting heat to the fluid in the portion of each tube 74 in the lower passage 80, thereby vaporizing the fluid. The vapor rises up the tubes into the upper passage 79 where it rejects heat to the cool gaseous fuel 56, thereby heating the fuel and condensing the vapor. The condensate then drips back down to the portion of each tube 74 in the lower passage 80 and the cycle is repeated. Utilization of such a passive circulation method, as opposed to the positive circulation provided by the pump 63 shown in FIGS. 1 and 2, provides additional reliability for the heat transfer apparatus.

FIG. 3 shows another way, in addition to the auxiliary heat exchanger 66 shown in FIG. 2, of cooling the cooling air 29 if, instead of gaseous fuel 56, the gas turbine were operating on a liquid fuel, which, as previously discussed, is not to be heated. Specifically, the cooling air 29 is allowed to flow through a secondary cooling air heat exchanger 61, which may be of the fin-fan type previously discussed, and which is connected in parallel with the primary cooling air heat exchanger. A fan 58 causes ambient air 59 to flow through the secondary heat exchanger 61, thereby allowing the ambient air to absorb heat from the cooling air 29 directly. This approach is applicable to the embodiments shown in FIGS. 1 and 2, as well.

Although the current invention has been described by reference to "shell and tube" and "heat pipe" type heat exchangers, other types of heat exchangers could also be utilized, such as spiral heat exchangers. Moreover, the present invention may be embodied in other specific forms without departing from the spirit or essential attributes thereof and, accordingly, reference should be made to the appended claims, rather than to the foregoing specification, as indicating the scope of the invention.

We claim:

1. A combustion turbine system comprising a compressor system in which air is compressed to provide compressed air, a combustion section which is connected to said compressor section so as to receive compressed air therefrom and in which fuel is mixed with the compressed air and combusted to generate hot compressed gas and a turbine section in which the hot compressed gas is expanded to generate power, said system further including conduit means in communication with said compressor section and said turbine section for diverting a portion of said compressed air to said turbine section for cooling turbine components therein, heat transfer means connected so as to receive said diverted portion of said compressed air from said compressor section, and fluid supply means connected to said heat transfer means and said combustion section for injecting a first fluid into the compressed air in said combustion section, said heat transfer means containing a heat transfer fluid and having means for preventing contact between said first fluid and said heat transfer fluid and for allowing the transfer of heat from said diverted portion of said compressed air to said heat transfer fluid and from said heat transfer fluid to said first fluid before said first fluid enters said combustion section.

2. A combustion turbine system according to claim 1, wherein said first fluid is water which, after being heated in said heat transfer means, is injected into the compressed air in said combustion section.

3. A combustion turbine system according to claim 1, further comprising:
   a) an auxiliary heat exchanger for cooling said heat transfer fluid by transferring heat therefrom to a second heat transfer fluid; and
   b) a heat recovery stream generator for vaporizing said second heat transfer fluid by recovering heat from said gas expanded by said turbine section.

4. A combustion turbine system according to claim 1, further comprising a supplemental heat exchanger for cooling said diverted portion of said compressed air by flowing ambient air through said supplemental heat exchanger.

5. A combustion turbine system according to claim 1, further comprising means for controlling the temperature of said diverted portion of said compressed air by controlling the temperature of said heat transfer fluid.

6. A combustion turbine system according to claim 5, wherein said heat transfer means comprises first and second heat exchangers, and wherein said temperature control means comprises an auxiliary heat exchanger for cooling a first portion of said heat transfer fluid, and further comprising means for diverting said first portion of said heat transfer fluid to flow through both said first and second heat exchangers and said auxiliary heat exchanger and for directing a second portion of said heat transfer fluid to flow through only said first and second heat exchanger.

7. A combustion turbine system comprising a compressor section in which air is compressed to provide compressed air, a combustion section which is connected to said compressor section so as to receive compressed air therefrom and in which fuel is mixed with the compressed air and combusted to generate hot compressed gas and a turbine section in which the hot compressed gas is expanded to generate power, said system further including conduit means in communication with said compressor section and said turbine section for diverting a portion of said compressed air from said compressor section to said turbine section for cooling turbine components therein, and heat transfer means connected so as to receive said diverted portion of said compressed air from said compressor section and fluid supply means connected to said heat transfer means and said combustion section for injecting a first fluid into said compressed air in said combustion section, said first fluid being in heat exchange relation in said heat transfer means with said diverted portion of said compressed air so as to transfer heat from said diverted portion of said compressed air to said first fluid before said first fluid enters said combustion section, said heat transfer means comprising first and second heat exchangers, said first heat exchanger connected to receive said diverted portion of said compressed air from said compressor section and said second heat exchanger connected to said fluid supply means so as to receive said first fluid, said first and second heat exchangers being in communication by an intermediate heat transfer circuit including a heat transfer fluid receiving heat from said diverted portion of said compressed air in said first heat exchanger and transferring it to said first fluid in said second heat exchanger.

8. A combustion turbine system according to claim 23, further comprising means for maintaining said intermediate heat transfer circuit at a pressure lower than the pressure of either the compressed air diverted from the compressor section or said first fluid supplied to the combustion section.

9. A combustion turbine system according to claim 7, wherein said first fluid is fuel which, after being heated in said heat transfer means, is injected into the compressed air in said combustion section.

10. A combustion turbine system according to claim 7, further comprising means for circulating said heat transfer fluid through both of said first and second heat exchangers.

11. A combustion turbine system according to claim 1, wherein said means for circulating said heat transfer fluid through both of said first and second heat exchangers comprises passive circulation means.

12. A combustion turbine system according to claim 7, wherein:
   a) said first heat exchanger comprises (i) a first flow path for said diverted portion of said compressed air, (ii) a second flow path for said heat transfer fluid, and (iii) means for preventing fluid communication between said first and second flow paths; and
   b) said second heat exchanger comprises (i) a third flow path for said first fluid, (ii) a fourth flow path for said heat transfer fluid, and (iii) means for preventing fluid communication between aid third and fourth flow paths.

13. A combustion turbine system according to claim 12, wherein said heat transfer means further comprises a pump for circulating said heat transfer fluid successively through said second and fourth flow paths.

* * * * *